United States Patent
Naqvi et al.

(10) Patent No.: US 8,483,898 B2
(45) Date of Patent: Jul. 9, 2013

(54) METHOD AND APPARATUS FOR CONTROLLING SPEED OF AN ELECTRIC PUMP IN A VEHICLE

(75) Inventors: Ali K. Naqvi, White Lake, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 434 days.

(21) Appl. No.: 12/949,911

(22) Filed: Nov. 19, 2010

(65) Prior Publication Data

US 2012/0035794 A1 Feb. 9, 2012

Related U.S. Application Data

(60) Provisional application No. 61/370,861, filed on Aug. 5, 2010.

(51) Int. Cl.
*F16D 43/28* (2006.01)

(52) U.S. Cl.
USPC ........ 701/22; 417/1; 417/13; 417/19; 417/22; 417/26; 417/42; 417/43; 477/34; 477/38; 477/50; 477/70; 477/72; 477/166; 477/168; 701/36; 701/51; 701/67; 60/325; 60/327; 192/218; 192/221; 192/12 R; 192/13 R; 192/30 R; 192/31; 192/48.1; 192/48.601; 192/54.1; 192/58.2; 415/18

(58) Field of Classification Search
None
See application file for complete search history.

(56) References Cited

U.S. PATENT DOCUMENTS

| | | | |
|---|---|---|---|
| 5,216,606 A * | 6/1993 | Lentz et al. | 701/66 |
| 5,799,260 A * | 8/1998 | Droste et al. | 701/51 |
| 6,292,732 B1 * | 9/2001 | Steinmetz et al. | 701/67 |
| 6,637,530 B1 * | 10/2003 | Endo et al. | 180/65.25 |
| 7,643,925 B2 * | 1/2010 | Whitton | 701/67 |
| 7,693,635 B2 * | 4/2010 | Rains | 701/51 |
| 8,066,620 B2 * | 11/2011 | Sah | 477/175 |
| 2001/0049574 A1 * | 12/2001 | Taniguchi et al. | 701/51 |
| 2002/0091034 A1 * | 7/2002 | Nakamori et al. | 477/3 |
| 2004/0179962 A1 * | 9/2004 | Hopper | 417/426 |
| 2006/0178244 A1 * | 8/2006 | Whitton et al. | 477/181 |
| 2007/0054775 A1 * | 3/2007 | Chen et al. | 477/121 |
| 2007/0179017 A1 * | 8/2007 | Yamada et al. | 477/107 |
| 2007/0221462 A1 * | 9/2007 | Rains | 192/3.3 |
| 2009/0111644 A1 * | 4/2009 | Kaminsky et al. | 477/5 |
| 2009/0241535 A1 * | 10/2009 | Schultz et al. | 60/486 |
| 2009/0264231 A1 * | 10/2009 | Ogata et al. | 474/11 |
| 2010/0018808 A1 * | 1/2010 | Gloge | 184/6.12 |
| 2010/0323839 A1 * | 12/2010 | Kawai | 475/210 |
| 2010/0332091 A1 * | 12/2010 | Kato et al. | 701/58 |
| 2011/0086740 A1 * | 4/2011 | Suzuki et al. | 477/5 |

* cited by examiner

*Primary Examiner* — Jonathan M Dager
(74) *Attorney, Agent, or Firm* — Quinn Law Group, PLLC

(57) ABSTRACT

A vehicle includes a clutch set, a tank with fluid, an auxiliary battery, an electric fuel pump, and a controller. The electric fluid pump delivers some of the fluid from the tank to a designated oncoming clutch of the clutch set. The controller calculates a predicted flow value for the oncoming clutch during the shift event, and selectively controls the speed of the pump using the predicted flow value during the shift event. The controller controls the pump using an actual flow value when the vehicle is not executing a shift event, i.e., when holding torque. The speed of the electric fluid pump is increased to a first calculated speed determined using the predicted flow value when the shift event is initiated and before filling of the oncoming clutch commences, and is reduced to a second calculated speed determined using the actual flow value when the shift event is complete.

15 Claims, 2 Drawing Sheets

METHOD AND APPARATUS FOR CONTROLLING SPEED OF AN ELECTRIC PUMP IN A VEHICLE

CROSS REFERENCE TO RELATED APPLICATIONS

This application claims the benefit of U.S. Provisional Patent Application No. 61/370,861, filed Aug. 5, 2010, which is hereby incorporated by reference in its entirety.

TECHNICAL FIELD

The present invention relates to a method and apparatus for controlling the speed of an electric fluid pump in a vehicle.

BACKGROUND

Battery electric vehicles, extended-range electric vehicles, and hybrid electric vehicles each use a rechargeable high-voltage energy storage system (ESS), e.g., a rechargeable battery, to deliver electrical power to one or more traction motors. The traction motor(s) alternately draw power from and deliver power to the ESS as needed. When propelled solely using electricity, the operating mode of the vehicle is referred to as an electric-only or EV operating mode.

In a hybrid electric vehicle design, an internal combustion engine may be used to generate torque suitable for propelling the vehicle in various operating modes. An extended-range electric vehicle uses an engine having a reduced size to selectively power a generator, which in turn delivers electricity to the traction motor either directly or via the ESS. Such a decoupled engine configuration can extend the effective EV range of the vehicle after the state of charge of the ESS becomes substantially depleted.

Vehicles that use an engine for direct mechanical propulsion or for generating electricity may employ an engine-driven main fluid pump to deliver fluid under pressure to a transmission. Clutches, valve bodies, gear sets, and other lubricated components are thus provided with a reliable supply of fluid during any engine-on operating modes. However, the engine-driven main pump may be unavailable when the vehicle is traveling in an EV mode. Battery-electric designs lack an engine, and therefore an engine-driven main pump. Therefore, an electrically-actuated fluid pump may be used to circulate fluid in an EV mode-equipped vehicle.

SUMMARY

Accordingly, a vehicle is provided herein having a clutch set, a tank containing fluid, a battery, an electrically-actuated/electric fluid pump powered by the battery, and a controller. The fluid pump delivers some of the fluid from the tank to the clutch set. The controller calculates each of an actual flow value for holding torque across the clutch set and a predicted flow value for rapidly filling a designated oncoming clutch of the clutch set during a shift event. The controller automatically increases the speed of the fluid pump to a first calculated speed, which is determined using the predicted flow value, when the shift event is initiated and before commencing a filling of the designated oncoming clutch. When the shift event is completed, the controller automatically reduces the speed of the fluid pump to a second calculated speed, which may be determined using the actual flow value.

The vehicle may optionally include an internal combustion engine and an engine-driven main fluid pump. In such a configuration, the fluid may be provided to the clutch set by the engine-driven main fluid pump after the shift event is complete, and the fluid pump may be turned off.

The controller calculates the first calculated speed using the predicted flow as a function of temperature of the fluid and a calibrated geometry of the oncoming clutch. The calibrated geometry of the oncoming clutch may include various calibrated or known factors, for example a leak rate within and/or a pressure drop across the designated oncoming clutch.

The vehicle may include an internal combustion engine and a traction motor in an embodiment in which the engine is selectively used to either propel the vehicle or to generate electricity for powering the traction motor. Fluid may be provided to the clutch set at all times solely using the electrically-actuated fluid pump noted above. That is, an engine-driven main pump may be dispensed with entirely depending on the design, even if an engine is present.

A method is also provided for controlling an electric fluid pump in a vehicle having a controller, a clutch set, a fluid tank containing fluid, a battery, and the fluid pump noted above. The method includes identifying an oncoming clutch within the clutch set for a commanded shift event, and calculating a predicted flow value for the oncoming clutch. The method also includes calculating a required speed of the fluid pump using the predicted flow value, increasing the speed of the fluid pump prior via a controller to commanding a fill pulse for filling the oncoming clutch with the fluid, and then reducing the speed of the fluid pump via the controller when the shift event is complete.

Another method is provided for controlling the electric fluid pump noted above. The method includes determining whether a shift event is imminent, and identifying a clutch within the clutch set that is to serve as a designated oncoming clutch during the shift event. The method further includes calculating a predicted flow value, via a controller, for the oncoming clutch using a geometric model of the oncoming clutch, and commanding the fluid pump via a set of control and feedback signals from the controller, including the predicted flow value. Additionally, the method includes ramping, i.e., increasing at a calibrated rate, a speed of the fluid pump in advance of a fill pulse for the shift event. The speed is increased to a speed value corresponding to a calibrated pump speed needed for providing the predicted flow value; and then filling the oncoming clutch of the clutch set via the fluid pump.

The above features and advantages and other features and advantages of the present invention are readily apparent from the following detailed description of the best modes for carrying out the invention when taken in connection with the accompanying drawings.

DESCRIPTION

Figure 1:
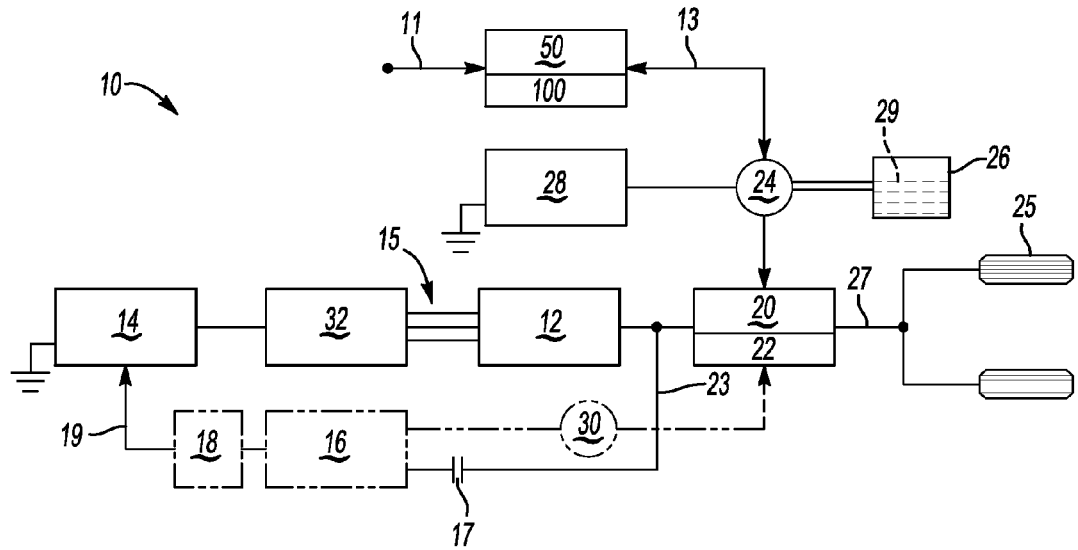
FIG. 1 is a schematic illustration of a vehicle having a controller which controls an electric fluid pump during a shift event as set forth herein.

Referring to the drawings, wherein like reference numbers correspond to like or similar components throughout the several figures, a vehicle 10 is shown in FIG. 1. The vehicle 10 includes a traction motor 12 and an energy storage system (ESS) 14. While only one traction motor 12 is shown for simplicity, multiple traction motors may be used depending on the design. The vehicle 10 may be configured as a hybrid electric vehicle (HEV), a battery electric vehicle (BEV), or an extended-range electric vehicle (EREV). Such vehicles can generate torque using the traction motor 12 at levels suitable for propelling the vehicle in an electric-only (EV) mode.

In some designs, an internal combustion engine 16, shown in phantom in FIG. 1, may be used to generate torque via an engine output shaft 23. Torque from the engine output shaft 23 can be used to either directly propel the vehicle 10, i.e., in an HEV design, or to power a generator 18, i.e., in an EREV design. The generator 18 can deliver electricity (arrow 19) to the ESS 14 to recharge the ESS. A clutch and damping assembly 17 may be used to selectively connect/disconnect the engine 16 from a transmission 20. Torque is ultimately transmitted from the traction motor 12 and/or the engine 16 to a set of drive wheels 25 via an output member 27 of the transmission 20.

The traction motor 12 may be embodied as a multi-phase permanent magnet/AC induction machine rated for approximately 60 volts to approximately 300 volts or more depending on the vehicle design. The traction motor 12 is electrically connected to the ESS 14 via a power inverter module (PIM) 32 and a high-voltage bus bar 15. The PIM 32 is configured for converting DC power to AC power and vice versa as needed. The ESS 14 may be selectively recharged using torque from the traction motor 12 when the traction motor is actively operating as generator, e.g., by capturing energy during a regenerative braking event. In some embodiments, such as plug-in HEV (PHEV), the ESS 14 can be recharged via an off-board power supply (not shown) when the vehicle 10 is idle.

The transmission 20 has at least one lubricated clutch set 22. The clutch set 22 includes one or more fluid-actuated torque transfer mechanism, e.g., interposed clutch plates having friction material on interfacing surfaces as understood in the art. The clutch set 22 is selectively engaged during an upshift, downshift, or any other shift event in order to transfer torque within the transmission 20.

Still referring to FIG. 1, an electrically-actuated/electric fluid pump 24 is in fluid communication with the transmission 20 and a tank 26 containing a supply of fluid 29, e.g., oil or another suitably viscous fluid. The fluid pump 24 may be energized by a battery 28, or by a separate DC-DC converter device (not shown). In some vehicle designs an engine-driven main pump 30 may be used to deliver fluid 29 under pressure to the transmission 20 during engine-on operating modes. When the vehicle 10 is traveling in an EV mode, such a main pump 30 is unavailable. As noted above, the main pump 30 may be entirely absent, e.g., from a BEV design, and other EREV and HEV designs may likewise forego use of a main pump for cost/weight savings.

A controller 50 is electrically connected to the fluid pump 24, and is configured for controlling its operating speed. The controller 50 does so in part by executing an algorithm 100 which resides within the controller or is otherwise readily executable by the controller. The controller 50 commands the fluid pump 24 via a set of control and feedback signals (arrow 13). Execution of the algorithm 100 as described below with reference to FIGS. 2 and 3 optimizes a clutch fill event of the clutch set 22.

That is, contrary to the optional engine-driven main pump 30, the electric fluid pump 24 operates independently of engine speed. The speed of the fluid pump 24 is instead controlled as a function of fluid temperature, desired line pressure, and required oil flow for filling and holding the designated oncoming clutch within the clutch set 22. Speed of the fluid pump 24 is also determined in part by the amount of lubrication/cooling required within the transmission 20.

Input signals 11 carry the values of any required parameters for calculating a required flow value as explained below. The input signals 11 may include, for example, the leak rate of a designated oncoming clutch of clutch set 22, the calibrated or known geometry of the oncoming clutch, fluid passage size or distribution within a valve body of the transmission 20, fluid temperature, viscosity information, line pressure, etc.

Figure 2:
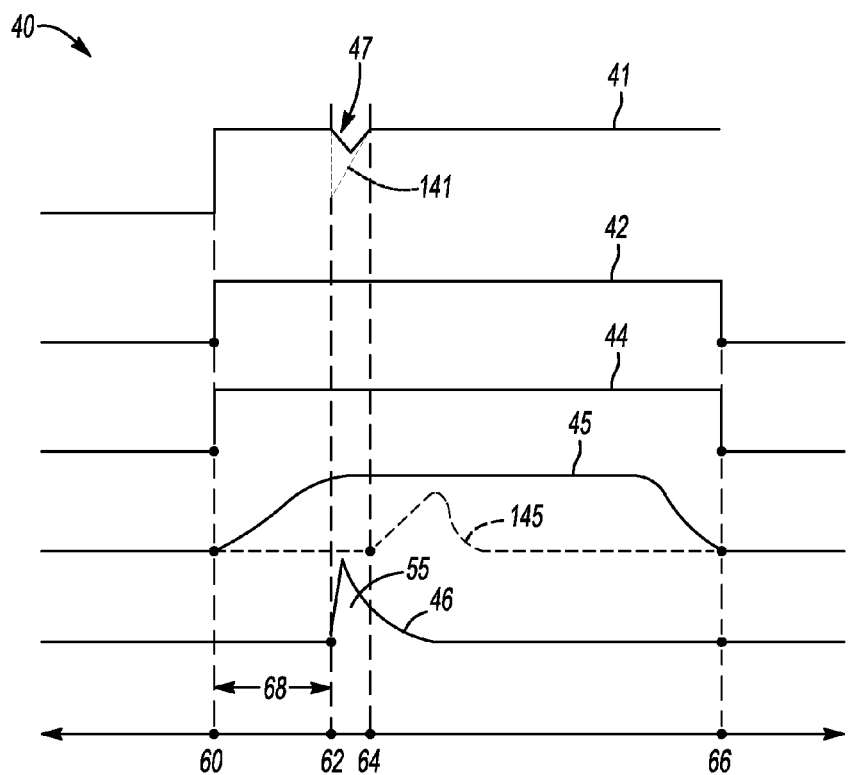
FIG. 2 is a set of traces describing control of the fluid pump shown in FIG. 1 during a shift event.
Figure 3:
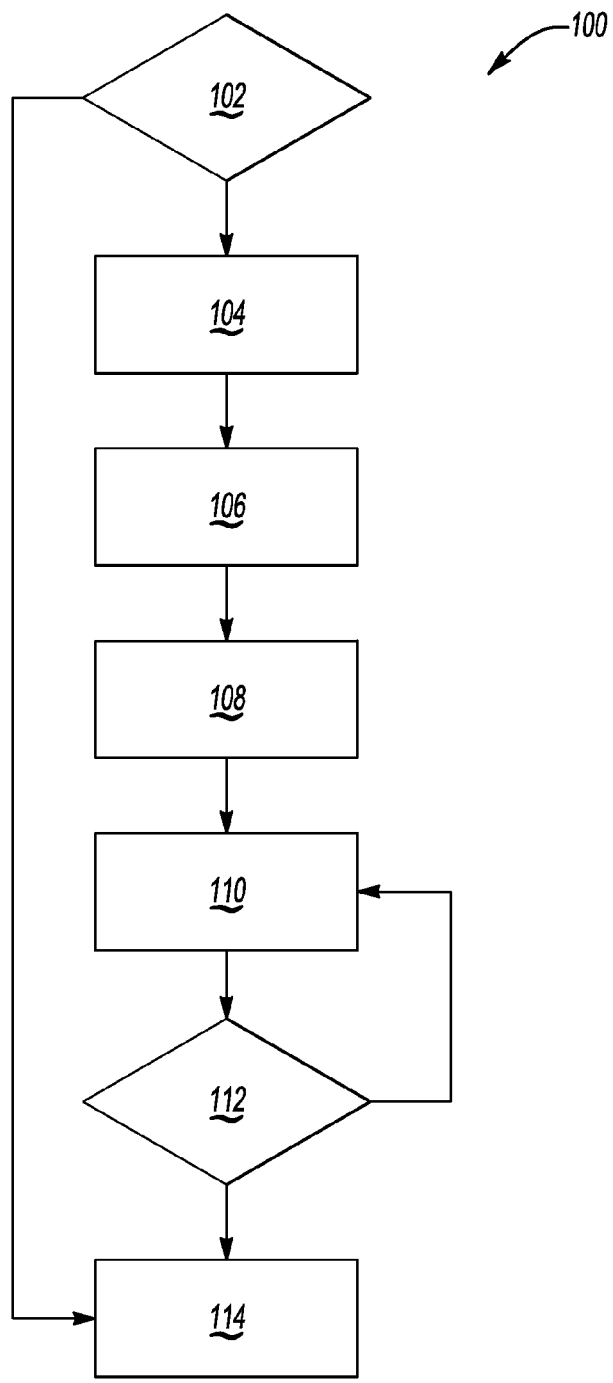
FIG. 3 is a flow chart describing a method for controlling the fluid pump aboard the vehicle shown in FIG. 1.

Referring to FIG. 3 in conjunction with a set of traces 40 as shown in FIG. 2, the algorithm 100 is executed by the controller 50 of FIG. 1 in order to optimize control of line pressure (trace 41) during a shift event. A shift event is represented in FIG. 2 as the duration between t=0 (point 60) and t=3 (point 66). Execution of the algorithm 100 by the controller 50 of FIG. 1 provides a predictable and consistent clutch fill behavior and line pressure control. Clutch slip on other holding clutches is minimized within the clutch set 22 to produce a smoother drive feel.

Under normal driving conditions, the fluid pump 24 must supply fluid 29 at a rate sufficient for maintaining line pressure (trace 41) while accommodating the amount of flow that is consumed by the clutch set 22. During the shift event, i.e., after a clutch fill event is commanded, a sudden rush of fluid 29 into the clutch set 22 comes with a momentary dip in line pressure (trace 41), as indicated by arrow 47. Trace 141 represents the dip in line pressure experienced absent the use of algorithm 100 as set forth herein. This temporary decrease in line pressure may result in slippage within the holding clutches of the clutch set 22. Execution of algorithm 100 largely prevents this from occurring.

Algorithm 100 begins with step 102, wherein the controller 50 of FIG. 1 determines whether a shift event is imminent, i.e., t=1 (point 60) of FIG. 2. Step 102 may include detecting a shift signal from a larger shift control algorithm signaling that a change of gear state has been commanded. The algorithm 100 then proceeds to step 104.

At step 104, the controller 50 sets a flag (trace 42) indicating the commencement of the shift event, and then identifies the particular clutch within the clutch set 22 of FIG. 1 that is to serve as the designated oncoming clutch during the shift event. Step 104 may entail determining vehicle speed, commanded shift sequence, etc. Once the oncoming clutch is identified, the algorithm 100 proceeds to step 106.

At step 106, the controller 50 calculates a predicted flow value (trace 44) for the oncoming clutch identified at step 104. Controller 50 may do so using a calibrated geometric model of the oncoming clutch within the clutch set 22 of FIG. 1, e.g., its size, volume, leak rate, fluid passage geometry within a valve body and any connecting conduits of the clutch, fluid temperature, pressure, and/or a pressure differential between the present line pressure and the required fill pressure.

In a simplified example, a predicted (turbulent) flow can be calculated via the formula $K \cdot A \cdot \sqrt{P_L}$, where K is the flow constant, A is the equivalent orifice area, and $P_L$ is the line pressure. Actual flow can be calculated via the formula $K \cdot A \cdot \sqrt{(P_L - P_C)}$, where $P_C$ is the required clutch pressure. The actual formula or formulas used to calculate the predicted and actual flow values may be more complex than this, e.g., taking into consideration as many parameters affecting the fluid dynamics of the oncoming clutch as is desired. Maximum flow is thus calculated for the present operating conditions of the oncoming clutch of the clutch set 22 for its full-open or maximum fill rate position. The algorithm 100 proceeds to step 108 once the predicted flow has been calculated. In actual operation, both the predicted and the actual flow values may be continuously calculated and recorded in an accessible memory location of the controller 50.

At step 108, the controller 50 commands the fluid pump 24 of FIG. 1 via the set of control and feedback signals (arrow 13 of FIG. 1). The controller 50 does this by using the predicted flow value (trace 44 of FIG. 2) previously calculated at step 106. In normal operation, i.e., before the shift event is initiated at t=0 (point 60), the controller 50 uses an actual flow value to control the fluid pump 24, switching at step 108 to use of the predicted flow value (trace 44).

The speed of the fluid pump 24, which is indicated by trace 45 in FIG. 2, ramps up at t=0 (point 60) at a calibrated rate to a speed value corresponding to a pump speed needed for providing the predicted flow value (trace 44). Note that a fill pulse 55 actually begins at t=1 (point 62), and therefore the fluid pump 24 is pre-staged by the duration indicated in FIG. 2 by double arrows 68. That is, the speed of the fluid pump 24 is increased well in advance of the fill pulse 55. When the fill pulse 55 is required, the fluid pump 24 is already running at the required speed.

At step 110, the designated oncoming clutch of clutch set 22 (see FIG. 1) is rapidly filled via the fluid pump 24, which at t=1 (point 62) is running at the calculated speed necessary for filling the oncoming clutch. Trace 145 of FIG. 2 shows, in dotted line format, the trajectory of the speed of the fluid pump 24 absent the pre-staging of the pump. A time lag exists between t=1 and t=2, i.e., between points 62 and 64, before the fluid pump 24 is able to reach its required speed. By t=2 (point 64), the fill pulse 55 has largely decayed. A partial or delayed clutch fill results in an accompanying shift harshness or slip.

At step 112, the algorithm 100 determines whether the shift event which was initiated at t=0 (point 60) is complete. If so, the algorithm 100 proceeds to step 114. If not, the algorithm 100 repeats steps 110 and 112 in a loop until the shift event is complete.

At step 114, the controller 50 switches back to using the actual flow value to control the fluid pump 24. The flag represented by trace 42 is turned off, and the pump speed (trace 45) is minimized. In this manner, the fluid pump 24 of FIG. 1 is not kept running at full speed when it is not required, but instead the pump speed is maintained only at a level determined by the actual flow through the clutch set 22.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a clutch set;
   a tank containing fluid;
   a battery;
   an electric fluid pump electrically connected to the battery, and configured for delivering some of the fluid from the tank to the clutch set; and
   a controller operable for calculating each of an actual flow value for holding torque across the clutch set and a predicted flow value for rapidly filling a designated oncoming clutch of the clutch set during a shift event;
   wherein the controller:
      automatically increases the speed of the electric fluid pump to a first calculated speed, wherein the first calculated speed is determined using the predicted flow value when the shift event is initiated and before filling of the designated oncoming clutch commences; and
      automatically reduces the speed of the electric fluid pump to a second calculated speed, wherein the second calculated speed is determined using the actual flow value when the shift event is completed.

2. The vehicle of claim 1, further comprising an internal combustion engine and an engine-driven main fluid pump, wherein the fluid is provided to the clutch set by the engine-driven main pump after the shift event is complete, and wherein the second calculated speed is approximately zero.

3. The vehicle of claim 1, wherein the controller calculates the first calculated speed using the predicted flow value as a function of temperature of the fluid and a calibrated geometry of the designated oncoming clutch.

4. The vehicle of claim 3, wherein the calibrated geometry of the oncoming clutch includes at least one of: a calibrated leak rate within the designated oncoming clutch, and a calibrated pressure drop across the designated oncoming clutch.

5. The vehicle of claim 1, further comprising an internal combustion engine and a traction motor, wherein the engine is selectively used to either propel the vehicle or to generate electricity for powering the traction motor, and wherein the fluid is provided to the clutch set at all times solely by the electric fluid pump.

6. A method for controlling an electric fluid pump in a vehicle having a clutch set, a fluid tank containing fluid, a battery, and the electric fluid pump, the method comprising:
   identifying an oncoming clutch within the clutch set for a commanded shift event;
   calculating, via the controller, a predicted flow value for the oncoming clutch;
   calculating, via the controller, a required speed of the electric fluid pump using the predicted flow value;
   increasing the speed of the electric fluid pump prior to commanding a fill pulse for filling the oncoming clutch with the fluid; and
   reducing the speed of the electric fluid pump when the shift event is complete.

7. The method of claim 6, wherein reducing the speed of the electric fluid pump when the shift event is complete includes switching to control of the electric fluid pump using an actual flow value to the clutch set.

8. The method of claim 6, further comprising:
   calculating the first calculated speed using the predicted flow as a function of temperature of the fluid and a calibrated geometry of the designated oncoming clutch.

9. The method of claim 8, wherein the calibrated geometry of the oncoming clutch includes at least one of: a calibrated leak rate within the designated oncoming clutch, and a calibrated pressure drop across the designated oncoming clutch.

10. The method of claim 6, wherein the vehicle includes an internal combustion engine and a traction motor, the method further comprising:
    using the engine to either propel the vehicle or to generate electricity for powering the traction motor; and
    providing the fluid to the clutch set at all times solely using the electric fluid pump.

11. A method for controlling an electric fluid pump in a vehicle having a clutch set, a fluid tank containing fluid, a battery, and the electric fluid pump, the method comprising:
    determining whether a shift event is imminent;
    identifying a clutch within the clutch set that is to serve as an oncoming clutch during the shift event.
    calculating a predicted flow value, via a controller, for the oncoming clutch using a geometric model of the oncoming clutch;

commanding the electric fluid pump via a set of control and feedback signals from the controller, including the predicted flow value;

ramping a speed of the electric fluid pump, in advance of a fill pulse for the shift event, to a speed value corresponding to a calibrated pump speed needed for providing the predicted flow value; and filling the oncoming clutch of the clutch set via the electric fluid pump.

12. The method of claim 11, further comprising:

determining whether the shift event is complete;

using an actual flow value for the oncoming clutch to control the electric fluid pump; and reducing the speed of the electric fluid pump to a level corresponding to the actual flow value.

13. The method of claim 11, wherein determining whether a shift event is imminent includes detecting a shift signaling that a change of gear state has been commanded.

14. The method of claim 11, wherein identifying the clutch includes determining one of: vehicle speed and a commanded shift sequence.

15. The method of claim 11, wherein the geometric model includes at least one of: size, volume, leak rate, fluid passage geometry, fluid temperature, pressure, and a pressure differential.

\* \* \* \* \*